US008755746B2

(12) United States Patent
Fok et al.

(10) Patent No.: US 8,755,746 B2
(45) Date of Patent: Jun. 17, 2014

(54) METHOD FOR TRANSMITTING VIRTUALIZED DATA IN CLOUD COMPUTING ENVIRONMENT

(75) Inventors: Frederic Fok, Berkshire (GB); Fabrice Beaugrand, Berkshire (GB)

(73) Assignee: NEC Corporation, Tokyo (JP)

( * ) Notice: Subject to any disclaimer, the term of this patent is extended or adjusted under 35 U.S.C. 154(b) by 493 days.

(21) Appl. No.: 13/147,543

(22) PCT Filed: Feb. 3, 2010

(86) PCT No.: PCT/JP2010/051907
§ 371 (c)(1),
(2), (4) Date: Aug. 2, 2011

(87) PCT Pub. No.: WO2010/090336
PCT Pub. Date: Aug. 12, 2010

(65) Prior Publication Data
US 2012/0058721 A1    Mar. 8, 2012

(30) Foreign Application Priority Data

Feb. 4, 2009   (EP) ..................... 09152039

(51) Int. Cl.
*H04B 7/00*    (2006.01)
(52) U.S. Cl.
USPC ......................................... 455/41.2; 455/411
(58) Field of Classification Search
CPC .... H04M 1/7253; H04W 12/06; H04W 12/08
USPC ................................ 455/41.2, 411
See application file for complete search history.

(56) References Cited

U.S. PATENT DOCUMENTS

| | | | |
|---|---|---|---|
| 7,920,549 B2* | 4/2011 | Alt et al. ....................... 370/352 |
| 2003/0169180 A1* | 9/2003 | Hardman ................. 340/870.01 |
| 2009/0047903 A1* | 2/2009 | Eisenbach .................... 455/41.2 |
| 2009/0061888 A1* | 3/2009 | Eonnet et al. ................. 455/450 |
| 2009/0305669 A1 | 12/2009 | Eonnet et al. |
| 2011/0003549 A1 | 1/2011 | Eisenbach |

FOREIGN PATENT DOCUMENTS

| | | |
|---|---|---|
| CN | 1514551 A | 7/2004 |
| CN | 1833481 A | 9/2006 |
| CN | 101310263 A | 11/2008 |
| EP | 0 691 619 A2 | 1/1996 |

(Continued)

*Primary Examiner* — April G Gonzales
(74) *Attorney, Agent, or Firm* — Foley & Lardner LLP

(57) ABSTRACT

The invention relates to a method for exchanging virtualized data in Cloud Computing Environment between a first User Equipment and a second User Equipment, said virtualized data being stored in a first memory area allocated to said first User Equipment in a first distant server, a second memory area is allocated to said second User Equipment in a second distant server for receiving said virtualized data, said first User Equipment and said second User Equipment exchanging specific information on said virtualized data over a short range wireless link, method characterized by the following step:
the first User Equipment proposes said virtualized data to the second User Equipment by means of a message sent through the short range wireless link,
the second User Equipment transmits to the first User Equipment the location in the second memory area where to transfer said virtualized data, and transmits to the first distant server its agreement to receive said virtualized data,
the first User Equipment requests said first distant server to transfer said virtualized data from the first memory area to the second memory area over the radio link.

14 Claims, 2 Drawing Sheets

(56) References Cited

FOREIGN PATENT DOCUMENTS

| | | | |
|---|---|---|---|
| EP | 1 892 603 A1 | 2/2008 |
| EP | 1 928 154 A1 | 6/2008 |
| FR | 2 898 238 A1 | 9/2007 |
| JP | 2007-336399 A | 12/2007 |
| JP | 2009-20739 A | 1/2009 |

\* cited by examiner

METHOD FOR TRANSMITTING VIRTUALIZED DATA IN CLOUD COMPUTING ENVIRONMENT

This application is the National Phase of PCT/JP2010/051907, filed Feb. 3, 2010, which claims priority to European Application No. 09152039.5, filed Feb. 4, 2009, the disclosures of which are hereby incorporated by reference in their entirety.

TECHNICAL FIELD

The invention pertains to telecommunication field and concerns a method for exchanging virtualized data in Cloud Computing Environment between a first User Equipment and a second User Equipment, said virtualized data being stored in a first memory area allocated to said first User Equipment in a first distant server, a second memory area is allocated to said second User Equipment in a second distant server for receiving said virtualized data, said first user Equipment and said second User Equipment exchanging specific information on said virtualized data over a short range wireless link.

The invention also concerns a system for exchanging virtualized data in Cloud Computing Environment between a first User Equipment and a second User Equipment, the system comprising a first distant server, a second distant server, a first memory area located in said first distant server for storing said virtualized data, a second memory area located in said second distant server for receiving said virtualized data, each of said first User Equipment and said second User Equipment comprising means for exchanging specific information on said virtualized data over a short range wireless link.

BACKGROUND ART

Today, it is very common to exchange data files from one device (e.g. mobile phone) to another device using short range wireless communication means such as NFC technology (Near Field Communication) Bluetooth or IRDA technologies.

Generally, the growing data files are physically exchanged between the devices using a radio link.

SUMMARY OF THE INVENTION

Technical Problem

The mobile terminals are increasingly using applications that generate large data files such as video or audio files that the users may wish to exchange for professional or leisure purpose. More particularly in Cloud Computing the need exists that resources be provided as a service over the Internet and by extension over Telecommunication Networks.

One disadvantage of the prior art comes from the fact that the large size of the data files to share necessitates to provide the mobile terminals with substantial memories, sufficient power transmission and battery capacities.

It follows an increasing in the cost and size of the mobile terminals. Moreover, because of the various types of data to be exchanged, the management of said data by the mobile terminals is becoming more and more complicated.

The invention aims at overcoming the disadvantages described above by means of a method and a system for exchanging virtualized data between two mobile devices wherein the exchanged data are not necessarily stored on said mobile terminals.

Solution to Problem

The object of the invention is achieved by means of a method for exchanging virtualized data in Cloud Computing Environment between a first User Equipment and a second User Equipment, said virtualized data being stored in a first memory area allocated to said first User Equipment in a first distant server, a second memory area is allocated to said second User Equipment in a second distant server for receiving said virtualized data, said first User Equipment and said second User Equipment exchanging specific information on said virtualized data over a short range wireless link.

The method according to the invention comprises the following steps:

the first User Equipment proposes said virtualized data to the second User Equipment by means of a message sent through the short range wireless link, the second User Equipment transmits to the first User Equipment the location in the second memory area where to transfer said virtualized data, and transmits to the first distant server its agreement to receive said virtualized data, the first User Equipment requests said first distant server to transfer said virtualized data from the first memory area to the second memory area using existing data transfer protocol such as the File Transfer Protocol (FTP) or the HTTP Push methods.

According to the invention, the specific information may represent information of the virtualized data such as meta-information, the location where to find the virtualized data in the Cloud Computing Environment, and the path where to find the resources on a memory area, and means for identifying a virtual machine.

According to a first embodiment of the invention, the first User Equipment and the second User Equipment exchange said specific information on said virtualized data over a Bluetooth link.

According to a second embodiment of the invention, the first User Equipment and the second User Equipment exchange said specific information on said virtualized data over a Wi-Fi link.

According to a third embodiment of the invention, the first User Equipment and the second User Equipment exchange said specific information on said virtualized data over a Near Field Communication (NFC) link.

According to a third embodiment of the invention, the first User Equipment and the second User Equipment exchange said specific information on said virtualized data over a IRDA (InfraRed Device) link.

Said User Equipments UEA and UEB may be mobile phones, Personal Data Assistants (PDAs), laptops or any telecommunication mobile device.

In a preferred embodiment of the invention, the first User Equipment and the second User Equipment communicate respectively with said first distant server and said second distant server via a radio link (e.g. UMTS, LTE, WiMAX, WiFi, . . . ).

In a first variant of the preferred embodiment of the invention, said first and said second distant servers are located in a same telecommunication network.

In a second variant of the preferred embodiment of the invention, said first and said second distant servers are located in two different telecommunication networks. In such a configuration Cloud Computing architecture provides means to make the shared resources accessible. There can be service level agreements to ensure appropriate quality of service requirements.

The method according to the invention is implemented in a system for exchanging virtualized data in Cloud Computing Environment between a first User Equipment and a second User Equipment, said system comprising a first distant server, a second distant server, a first memory area located in said first distant server for storing said virtualized data, a second memory area located in said second distant server for receiving said virtualized data, each of said first User Equipment and said second User Equipment comprising means for exchanging specific information on said virtualized data over a short range wireless link.

The system according to the invention further comprise a first virtual machine hosted in the first distant servers and a second virtual machine hosted in the second distant server for transferring said virtualized data from said first memory area to said second memory area, using data transfer protocol such as FTP or HTTP Push methods, upon transmission of said specific information from the first UEA to the second UEB over the short range wireless link.

In a first embodiment, said first distant server and said second distant server are located in a same telecommunication network.

In a second embodiment, said first distant server and said second distant server are located in two different telecommunication networks.

Advantageous Effects of Invention

The object of the invention is achieved by means of a method for exchanging virtualized data in Cloud Computing Environment between a first User Equipment and a second User Equipment, said virtualized data being stored in a first memory area allocated to said first User Equipment in a first distant server, a second memory area is allocated to said second User Equipment in a second distant server for receiving said virtualized data, said first User Equipment and said second User Equipment exchanging specific information on said virtualized data over a short range wireless link.

BRIEF OF DESCRIPTION OF DRAWINGS

The forgoing summary, as well as the following detailed description, will be better understood when read in conjunction with the appended figures illustrating an exemplary embodiment of the invention in which.

DESCRIPTION OF EMBODIMENTS

Figure 1:
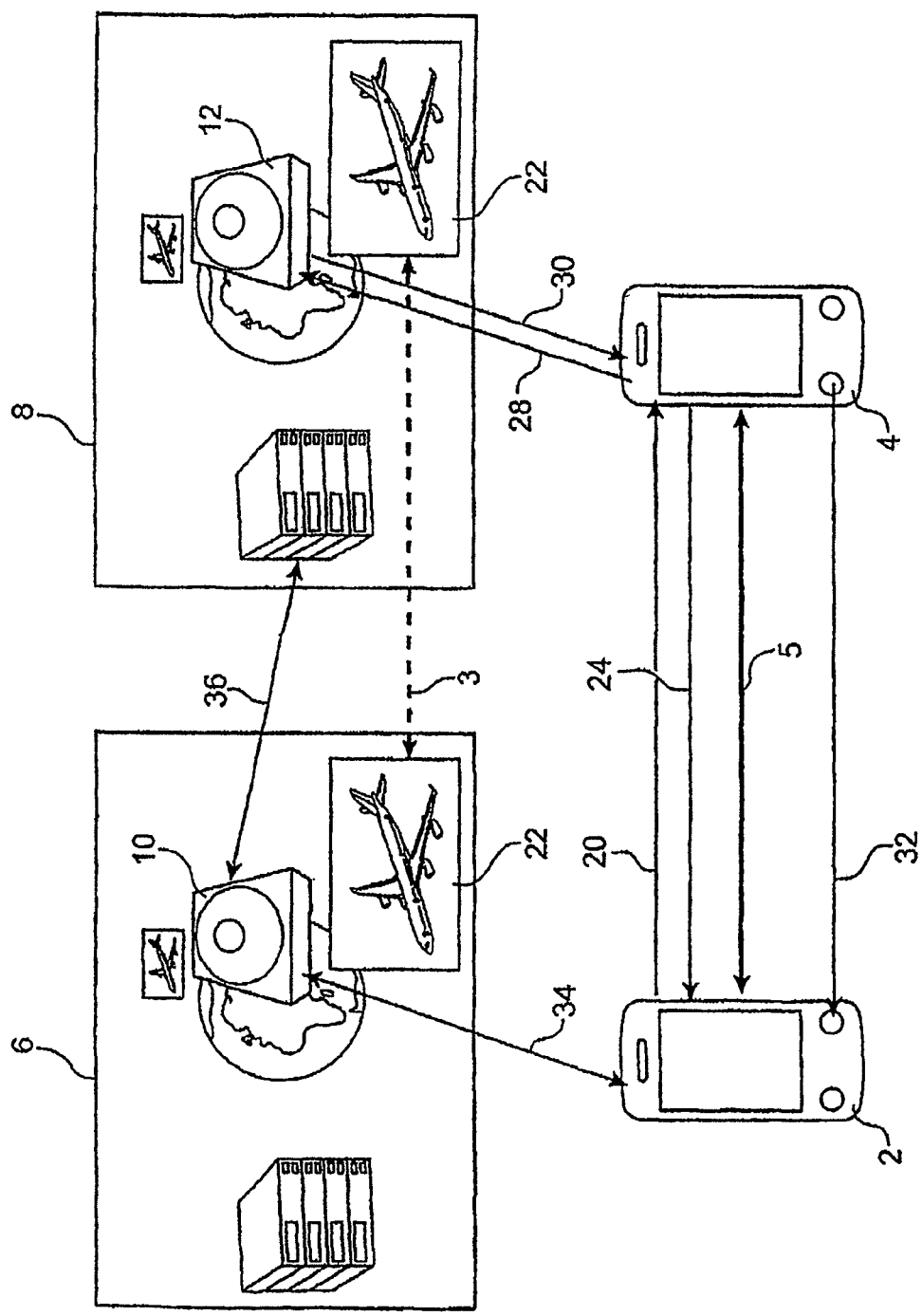
FIG. 1, is a schematic diagram illustrating the process according to the invention.
Figure 2:
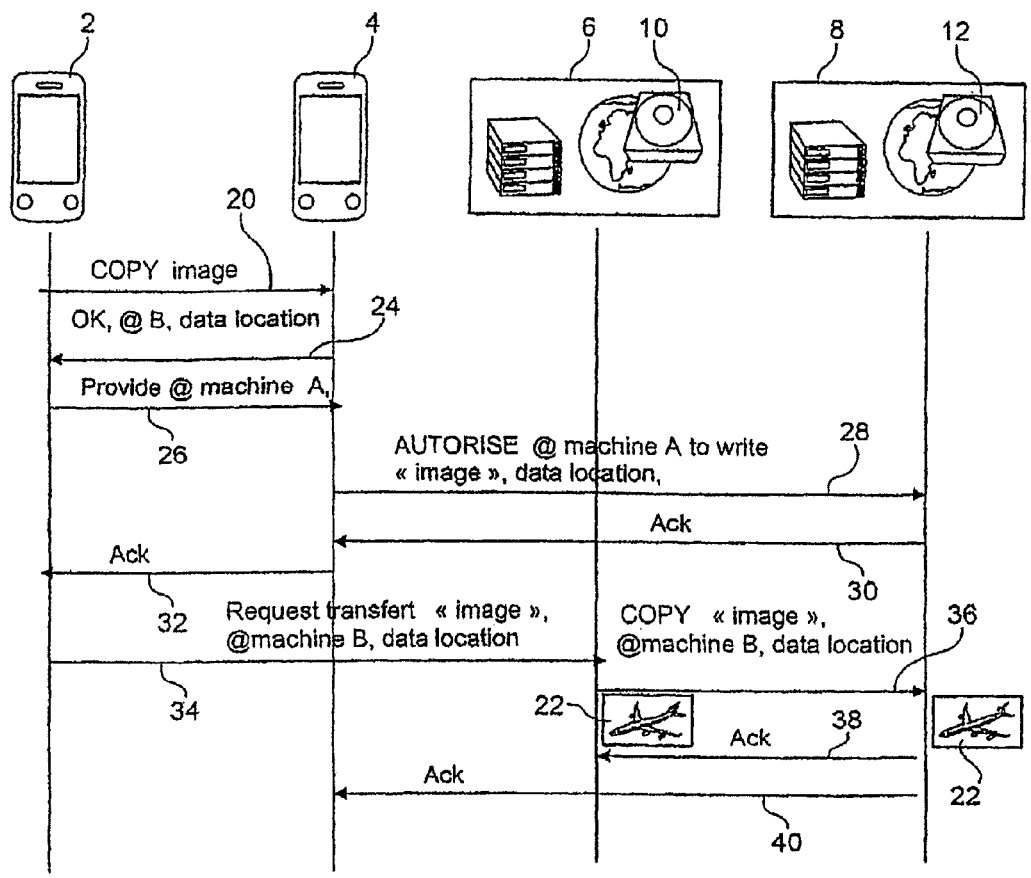
FIG. 2, is diagram showing the exchange of information between the terminals of FIG. 1.

The invention will be described by reference to FIGS. 1 to 2, illustrating a system for exchanging virtualized data in Cloud Computing Environment between a first User Equipment 2 and a second User Equipment 4, said system comprising a first distant server 6, a second distant server 8, a first memory area 10 located in said first distant server 6 for storing said virtualized data, a second memory area 12 located in said second distant server 8 for receiving said virtualized data, each of said first User Equipment 2 and second User Equipment 4 comprising means for exchanging specific information on said virtualized data over a short range wireless link 5.

Said specific information may represent information of the virtualized data such as meta-information, the location where to find the virtualized data in the Cloud Computing Environment, and the path where to find the resources on a memory area, and means for identifying a virtual machine.

In a preferred embodiment of the invention, the first server 6 hosts a first virtual machine programmed for managing the data belonging to the User Equipment 2, and the second server 8 hosts a second virtual machine programmed for managing the data belonging to the User Equipment 2.

The first virtual machine is accessible via internet, for example, from the first User Equipment 2 at the address of the virtual machine A and the second virtual machine is accessible via internet from the second User Equipment 4 at the address of the virtual machine B.

The first virtual machine and the second virtual machine may exchange data via interne or a secured dedicated radio link 3.

Referring now to FIG. 1 and to FIG. 2, the messages exchanged between the first User Equipment 2 and the second User Equipment 4 will be described when a first user of the first User Equipment 2 wishes to transfer an image to a second user of the second User Equipment 4.

Datafile_ID is the identifier of the image stored in the first memory area 10 that the first user wishes to share with the second user.

Data_location is the address of the Virtual machine and the location on said virtual machines where the image can be copied or pasted.

In a prefer embodiment of the invention, Data_location comprises the public IP network address of the virtual machine hosted on a network server and the absolute data path of the resource (e.g. [@IPpubliqueVMA/data_path]).

The Datafile_ID and Data_path may be concatenated in any form to identify the resource identity and its location on the Internet as well as on the resource filesystem of the network server. In a prefer embodiment this can be a specific absolute URL-formatted information such as ftp://Data_location:Datafile_Id that is syntactic sugar for the logical structure "Data_path:Datafile_D".

At step 20, the first User Equipment 2, controlled by the first user, transmits a message for proposing to share an image 22 stored in the first memory area 10 to the second User Equipment 4, controlled by the second user, through a RFID link, a Wi-Fi link, a Bluetooth link, an IRDA technologies link, or a NFC link.

In one particular embodiment said request message contains meta-information regarding the image such as the size, a small icon representative of a small variant of the image, and the title. There may be other meta-information like Digital Right Management (DRM) without departing from the scope of present invention.

At step 24, the second User Equipment 4 transmits to the first User Equipment 2 an agreement for the reception of said image 22, the Data_location comprising the address @machine B (e.g. a public IP address) and the Data_path on the second virtual machine where the image should be copied.

At step 26, the first User Equipment 2, transmits to the second User Equipment 4 the address @machine A and the Data_path of the image through said RFID link, said Wi-Fi link, said Bluetooth link, said IRDA technologies link, or said NFC link.

Besides there is a one-to-one mapping of the data_path value known by UE2 and the one known by Server 8.

At step 28, the second User Equipment 4 transmits to server 8 a message to authorize the first virtual machine to write the image data file on the data area 12 of server 8.

At step 30, the second virtual machine transmits an acknowledgement to the second User Equipment 4.

At step 32, the second User Equipment 4 preferably forwards said acknowledgement to the first User Equipment 2 so that the first User Equipment 2 request the transfer while knowing it has the authorization to do so.

At step 34, the first User Equipment 2 transmits to the first virtual machine a request to transfer the image 22 from the first memory area 10 in the server 6 to the memory area 12 in the server 8. The request comprises the @machine B, the data path in the first memory area 10. Besides there is a one-to-one mapping of the data path value known by said first User Equipment 2 and the one known by said server 6.

At step 36, the first virtual machine transfers the image 22 to the @machine B and copy said image to the data path on the second memory area 12.

The second virtual machine transmits, at step 38, an acknowledgement to the first virtual machine, and at step 40, an acknowledgement to the second User Equipment 4. This latter message can be in the form of a notification to advertise second User Equipment 4 that the image has been copied successfully.

In Step 36 and step 38 an existing data transfer protocol such as FTP is used to transfer the image from @machine A to @machine B in the second memory area 12 indicated by the data path in step 36.

It is to be noted that the data file may represent application data, video data or audio data without departing from the scope of the invention.

Figure 3:
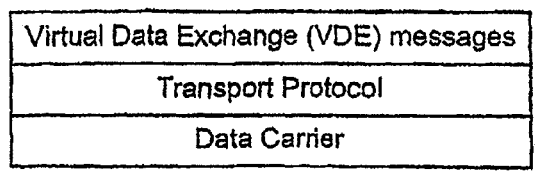
FIG. 3 illustrates an example of Virtual Data Exchange messages used in the method according to invention.

As illustrated at FIG. 3, the Virtual Data Exchange (VDE) messages are sent using a Transport Protocol such as TCP, UDP, NFC-based protocol, . . . over a Data Carrier such a Fixed Line or any other Wireless Medium of communication. Some of the messages (20, 24, 26, 32) are exchanged over a short range wireless communication like IRDA, Bluetooth, NFC, . . . .

The Virtual data messages can be XML (eXtensible Markup Language) formatted.

The invention claimed is:

1. A method for exchanging virtualized data in Cloud Computing Environment between a first User Equipment and a second User Equipment, said virtualized data being stored in a first memory area allocated to said first User Equipment) in a first distant server, a second memory area is allocated to said second User Equipment in a second distant server for receiving said virtualized data, said first User Equipment and said second User Equipment exchanging specific information on said virtualized data over a short range wireless link, method characterized by the following step:
   the first User Equipment proposes said virtualized data to the second User Equipment by means of a message sent through the short range wireless link,
   the second User Equipment transmits to the first User Equipment the location in the second memory area where to transfer said virtualized data, and transmits to the first distant server its agreement to receive said virtualized data,
   the first User Equipment requests said first distant server to transfer said virtualized data from the first memory area to the second memory area through a data transfer protocol.

2. A method according to claim 1 wherein said data transfer protocol may be FTP or HTTP push.

3. A method according to claim 1 wherein said User Equipment and second User Equipment exchange said specific information on said virtualized data over an IRDA technologies link.

4. A method according to claim 1 wherein said User Equipment and said second User Equipment exchange said specific information on said virtualized data over a Bluetooth link.

5. A method according to claim 1 wherein said first User Equipments and said second User Equipment exchange said specific information on said virtualized data over a Wi-Fi link.

6. A method according to claim 1 wherein said User Equipment and said second User Equipment exchange said specific information on said virtualized data over a NFC link.

7. A method according to claim 3 wherein said first User Equipment and said second User Equipment are mobile phones.

8. A method according to claim 3 wherein said first User Equipments and said second User Equipment are PDAs.

9. A method according to claim 1 wherein said first User Equipment and said second User Equipment communicate respectively with said distant servers and via a radio link.

10. A method according to claim 1 wherein said first distant server and said second distant server are located the same telecommunication network.

11. A method according to claim 1 wherein said first distant server and second distant server are located in two different telecommunication networks.

12. A system for exchanging virtualized data in Cloud Computing Environment between a first User Equipment and a second User Equipment, said system comprising a first distant server, a second distant server, a first memory area located in said first distant server for storing said virtualized data, a second memory area located in said second distant server for receiving said virtualized data, each of said first and second User Equipments and comprising means for exchanging specific information on said virtualized data over a short range wireless link, said system characterized in that the first User Equipment comprises means for proposing said virtualized data to the second User Equipment by means of a message sent through the short range wireless link, the second User Equipment comprises means for transmitting to the first User Equipment the location in the second memory area where to transfer said virtualized data, and transmits to the first distant server its agreement to receive said virtualized data, the first User Equipment comprises means for requesting said first distant server to transfer said virtualized data from the first memory area to the second memory area through a data transfer protocol.

13. System according to claim 12 wherein said first distant server and said second distant server are located in the same telecommunication network.

14. System according to claim 12 wherein said first distant server and said second distant server are located in two different telecommunication networks.

* * * * *